United States Patent [19]

Morita et al.

[11] Patent Number: 4,926,368
[45] Date of Patent: May 15, 1990

[54] ELECTRONIC APPARATUS WITH CURRENCY CONVERSION FUNCTION

[75] Inventors: Akitaka Morita, Nara; Toshio Nishimura, Joyo; Hiroshi Takada, Nara, all of Japan

[73] Assignee: Sharp Kabushiki Kaisha, Osaka, Japan

[21] Appl. No.: 170,014

[22] Filed: Mar. 18, 1988

[30] Foreign Application Priority Data

Mar. 20, 1987 [JP] Japan .................................. 62-66830

[51] Int. Cl.⁵ .......................... G06F 7/00; G06F 15/30
[52] U.S. Cl. ........................... 364/715.05; 364/710.04; 364/408
[58] Field of Search .................... 364/401, 408, 715.01, 364/715.05, 705.06, 710.01, 710.02, 710.04, 710.07, 710.1, 710.11

[56] References Cited

U.S. PATENT DOCUMENTS

| | | | |
|---|---|---|---|
| 4,092,523 | 5/1978 | Tava et al. | 364/715.05 |
| 4,120,451 | 10/1978 | Stapleton | 235/89 R |
| 4,192,006 | 3/1980 | Hansdorff | 364/710.04 |
| 4,251,867 | 2/1987 | Uchida et al. | 364/715.05 |
| 4,766,293 | 8/1988 | Boston | 364/408 |

FOREIGN PATENT DOCUMENTS 2923478 12/1980 Fed. Rep. of Germany ..................... 364/715.05

*Primary Examiner*—Gary V. Harkcom
*Assistant Examiner*—Dale M. Shaw
*Attorney, Agent, or Firm*—Birch, Stewart, Kolasch & Birch

[57] ABSTRACT

Electronic currency conversion apparatus including, among other things, an input keyboard comprising a set of keys for inputting amounts of money in each of two different currencies, calculating circuitry for calculating a currency conversion exchange rate according to the amounts of money inputted via the input keyboard circuitry for subsequently calculating a currency conversion for a predetermined amount of money inputted at the input keyboard based on the calculated conversion rate, mode selection keys operable by a user for selecting an exchange rate calculating mode and a currency conversion mode, and a visual display including exchange rate symbol display, the exchange rate symbol display being energized in a flashing type of indication during the exchange rate calculating mode upon the inputting of a money amount.

9 Claims, 3 Drawing Sheets

FIG. 4(a) 62.5 foreign
▶currency
| I |
foreign
▶currency
( OR | II | )

ELECTRONIC APPARATUS WITH CURRENCY CONVERSION FUNCTION

BACKGROUND OF THE INVENTION

The present invention relates to an electronic apparatus with a currency conversion function, and more particularly, to such an electronic apparatus for those who are travelling abroad or the like.

Conventionally, when an electronic apparatus converts currency, for example, yen into dollars or dollars into marks, first, a currency conversion constant (notified, for example, at a bank) is inputted, and then the currency conversion constant is stored as a data.

When currency conversion is actually made, the currency conversion constant already stored is used and the currency is converted by prescribed multiplication or division.

With this conventional type of apparatus, a currency conversion constant is indispensable and should be known to an operator, and it is very unconvenient especially when he is travelling abroad.

SUMMARY OF THE INVENTION

Accordingly, it is an object of the present invention to provide an electronic apparatus with a currency conversion function which facilitates currency conversion.

It is another object of the present invention to provide an electronic apparatus with a currency conversion function which converts currency with accuracy and without a specific currency conversion constant being inputted.

Briefly described, in accordance with the present invention, an electronic apparatus with currency conversion function comprises input means to input both of the amounts of money in one currency before conversion and the amount of money in another currency after conversion and calculating means to calculate the currency conversion constant from the amounts of money before and after the conversion, wherein the forthcoming currency conversion is made based on a calculated currency conversion constant which is displayed.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 4(a)-(d) are views which is illustrative of the operations and a display when an exchange rate is being set;

DESCRIPTION OF THE PREFERRED EMBODIMENT

Figure 1:
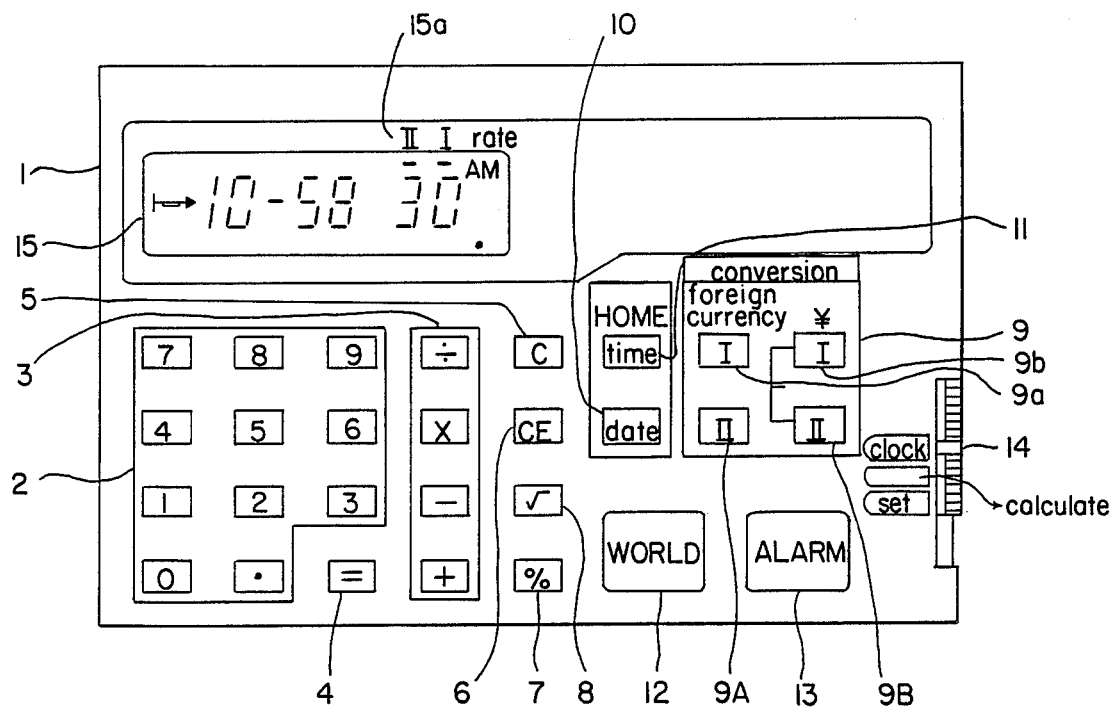
FIG. 1 is a plan view of an electronic apparatus with a currency conversion function as an embodiment of the present invention.

FIG. 1 is a plan view of an electronic apparatus with a currency conversion function as a preferred embodiment of the present invention. The apparatus includes a body member 1 having digit-keys 2, addition/subtraction/multiplication/division-keys 3, equal-key 4, clear-key 5, clear-entry-key 6, %-key 7 and a square root-key 8. These keys are used when the electronic apparatus is used as an electronic calculator.

A currency conversion key 9 is used for currency conversion. The currency conversion key 9 is operated in either of the following two cases;

(1) where the currency conversion constant (hereinafter referred as 'exchange rate') is known to an operator and the exchange rate is inputted; or (2) where the exchange rate is unknown to an operator and he sets the exchange rate at an exchanger by using both of the amounts of money in one currency before conversion and the amount of money in another currency after conversion.

The currency conversion key 9 comprises a first pair of keys, a foreign currency key☐9a and an yen key☐9b, and another pair of keys, a foreign currency key☐9A and an yen key☐9B.

The electronic apparatus of the present embodiment also functions as a world timepiece, for the convenience of those who are travelling abroad. Therefore, it has also a DATE key 10 and a TIME key 11 for setting and inputting the date and the time in his own country, a WORLD key 12 for calling the date and the time in a foreign country, and an alarm key 13 for setting an alarm.

As is described above, the electronic apparatus of the present embodiment has three modes: calculate mode (mode when the apparatus is used as an electronic calculator); set mode (used when a currency conversion is made); and clock mode (used when a date or a time is displayed). The mode selection is made by sliding a mode selection switch 14.

By selecting a mode from among the three, various information is displayed at a display 15. In FIG. 1, clock mode is selected and time information is displayed at the display 15.

Near the display 15, three indicia (II, I, and 'rate') are printed (in FIG. 1, shown as 15a). This corresponds to the function of the electronic apparatus of the present embodiment which can set two kinds of exchange rates. For example, in the display 15, a rate symbol '-' is displayed and the rate symbol indicates either of the two marks 'I' or 'II.' By use of the rate symbol, an operator can grasp which rate of the two rates, rate I or rate II is being used in the present conversion.

Figure 2:
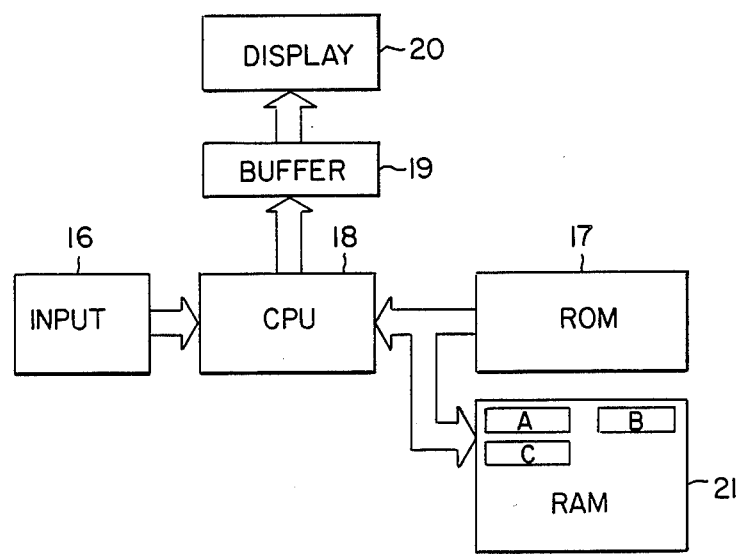
FIG. 2 is a block diagram of the electronic apparatus.

FIG. 2 is a block diagram of the electronic apparatus as an embodiment of the present invention.

The input poration 16 comprises plural keys, such as the digit-keys 2, the addition/subtraction/multiplication/division-key 3, the currency conversion key 9, and the mode selection switch 14.

A read-only memory (ROM) 17 stores various kinds of programs such as for addition/subtraction/multiplication/division processing, for display processing, for input processing, and for rate setting processing.

A processor (CPU) 18 carries out the calculation and display of the inputted numerals according to the programs of the ROM 17 based on the data inputted at the input portion 16.

The content of the processing of the processor 18 is fed to the display buffer 19 and the content thereof is displayed at the display 20 (display 20 in this FIG. 2 corresponds to 15 in FIG. 1). The display 20 is, for example, liquid crystal display, and displays inputted numerals or symbols.

A random access memory 21 includes a register A for key-input, a register B for calculation, and a register C for storing exchange rates.

A clock circuit is not shown in FIGS.

Figure 3:
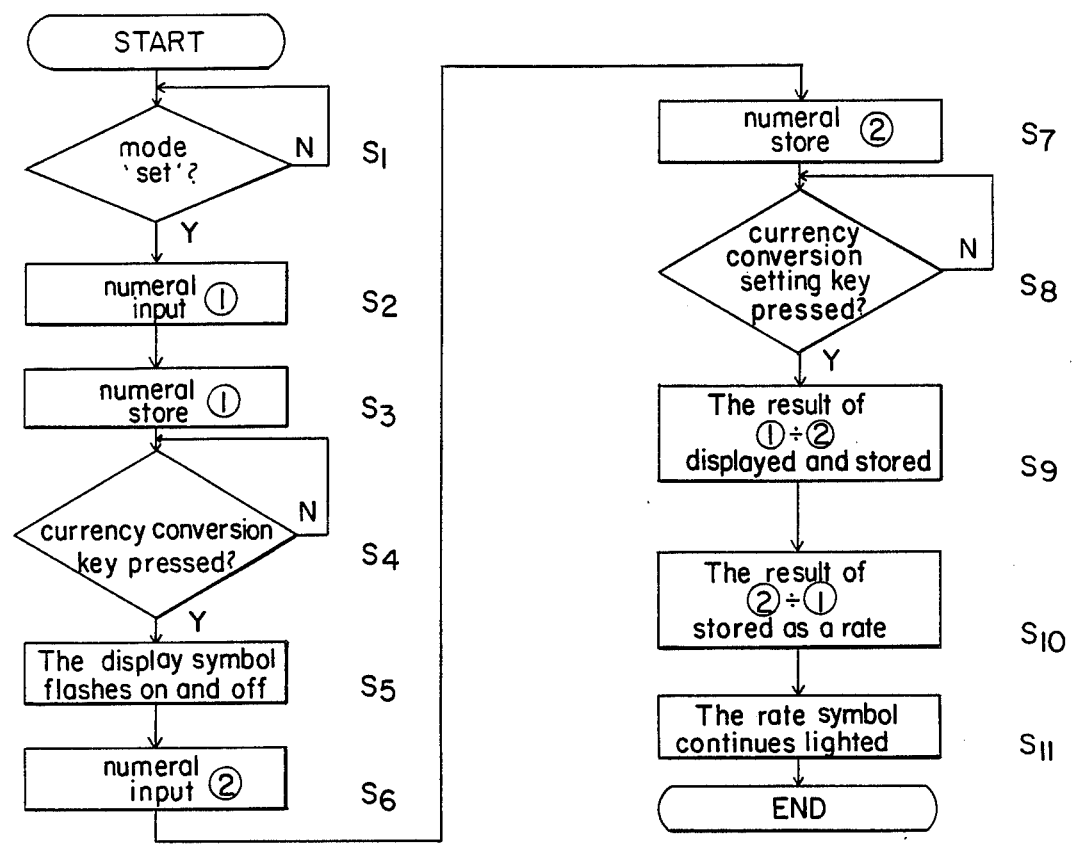
FIG. 3 is a flow chart showing the method of setting an exchange rate according to the present invention.
Figure 3:
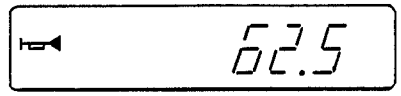

An exchange rate setting procedure is explained hereinafter according to FIG. 3.

First, at the step S1, it is determined which mode is chosen by the slide switch 14 provided at the input portion 16, i.e. the clock mode, calculate mode, or set mode.

When the set mode is chosen, then at the next step (S2), the first numeral is inputted by the digit-keys 2 of the input portion 16 (numeral input ①).

The numeral inputted at the step S2 is, at the step S3, stored in the register A of RAM 21 (numeral store ①).

The numeral inputted at the register A is also stored in the display buffer 18, by the control of the processor 18. The numeral is also displayed at the display 20.

Next, at the step S4, it is determined whether or not the currency conversion (setting) key 9 is pressed (operated). Only when it is determined that the currency conversion (setting) key 9 is pressed (operated) at the step S4, does the process move to the step S5.

At the step S5, the rate symbol which shows that the rate setting being processed is displayed. At this time, the content of the register A is transferred to the register B in the RAM 21.

After the above processing (input of the first numeral), the step S6 (numeral input ②), the step S7 (numeral store ②), and the step S8 is activated and the second numeral is stored in the register A by the same processing as the input of the first numeral.

Then, at the step S9, the division of the content of the register A by the content of the register B is activated, and at the next step S10, the result of the calculation is stored at the register C in the RAM 21.

After that, the content of the register C is displayed at the display 20 (S11).

As is described above, the exchange rate is stored in the register C of RAM 21.

The operation of the exchange rate setting is explained hereinafter by an illustrative example.

Figure 4B:
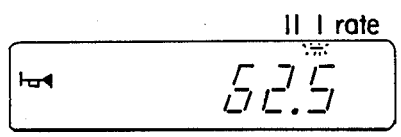
Figure 4B:
Figure 4D:

FIG. 4 shows the operation of an exchange rate setting when, for example, at a bank in an airport or so, 10,000 yen is exchanged for dollars and as a result, 62 dollars and 50 cents are received.

After selecting set mode by the slide switch 14 (FIG. 1), as is shown in (a) of FIG. 4, the amount of the received money (dollars) is inputted at the digit keys 2.

Next, as is shown in (b) of FIG. 4, when either currency conversion key 9a (or 9A) is pressed (operated), the rate symbol goes on and off, i.e. flashes indicating that a rate setting is in progress. The rate symbol is displayed at the mark 'I' when the currency conversion key 9a is pressed (operated), and at the mark 'II' when the currency conversion key 9A is pressed (operated).

Next and as is shown in (c) of FIG. 4, the amount of the money (yen) before conversion is inputted at the digit keys, and after that, as is shown in (d) of FIG. 4, if the yen key 9b (or 9B) is pressed (operated), 62.5÷10000 is calculated and displayed, while 10000÷62.5 is also calculated and its result is stored as an exchange rate. Once the exchange rate is set, the rate symbol is always continuously lighted (no longer goes on and off).

Accordingly in a currency conversion, the foreign currency key 9a and the yen key 9b, or, the pair of foreign currency key 9A and the yen key 9B are pressed (operated) in pairs.

As described above, with respect to the apparatus of this embodiment, first, the amount of the money after exchange is inputted as the numeral ① and by pressing the conversion key 9a or 9A, the numeral ① is stored. In the same way, next, the amount of the money before conversion is inputted as the numeral ② and by pressing the conversion key 9a or 9B, the numeral ② is stored.

Accordingly, numeral ③ (the result of ① ÷ ②) and the numeral 4 (the result of ② ÷ ①) are calculated and each of them is stored.

The numeral ③ is displayed and the numeral ④ is stored as an exchange rate. The numerals ①, ②, ③, and ④ can not be called individually, but the numerals stored as exchange rates can be called.

Figure 5:
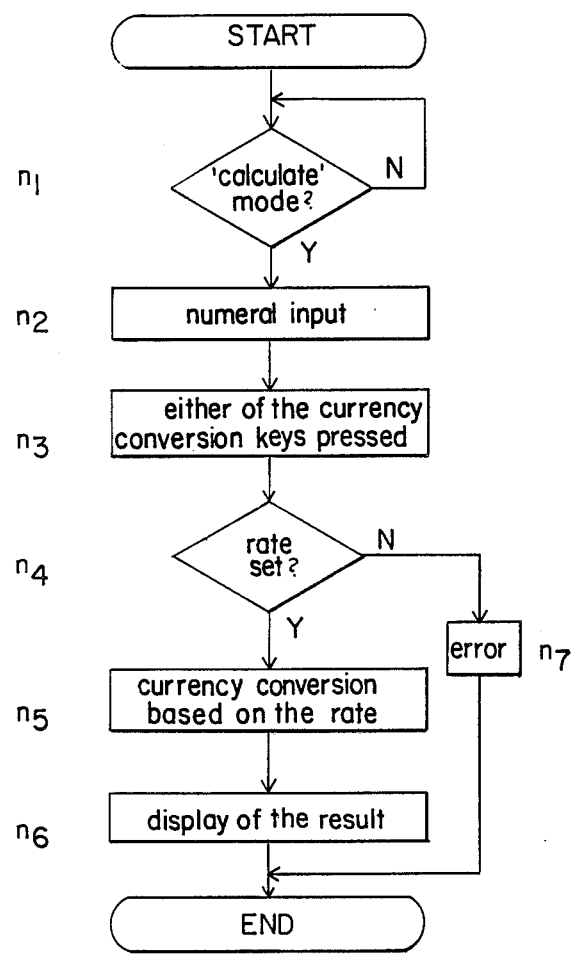
FIG. 5 is a flow chart which is illustrative of rate conversion processing.
Figure 5:
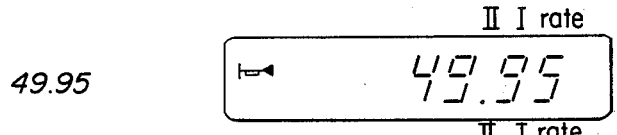

FIG. 5 is a flow chart which shows a processing procedure when a conversion is made according to a rate which is already set.

First, at the step $n^1$, it is determined whether or not the calculate mode is chosen. Only if it is determined that the calculate mode is chosen, it moves to the next step $n^2$.

At the step $n^2$, input of an amount of money (numeral) is made.

Then, at the step $n^3$, either of the currency conversion keys 9 is pressed (operated).

In response to the pressing (operation) of one of the currency conversion keys 9, the processor 18 decides whether or not the register C is storing an exchange rate ($n^4$), and only when the rate is stored, the currency conversion based on the exchange rate is activated ($n^5$).

The amount of money obtained as a result of the calculation is displayed at the display 20 ($n^6$).

If, at the $n^4$ step, it is determined that no rate is set, it moves to the step $n^7$ and error processing is activated.

An example of a currency conversion will now be provided.

Figure 6B:
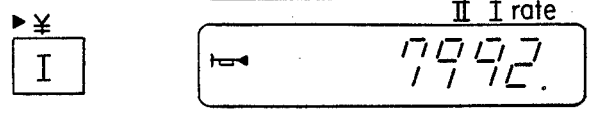
FIGS. 6(a), (b), and FIG. 7 are views which is illustrative of the operations and a display when a currency conversion is made.

FIG. 6 is illustrative of the operation of a currency conversion when an operator is abroad in a shop, desiring to buy an article (which costs 49.95 dollars), and wants to know the yen equivalent of 49.95 dollars. In this instance, 1 dollars=160 yen is set in advance at the rate I.

After the calculate mode is selected by the slide switch 14 (FIG. 1) and as is shown in (a) of FIG. 6, the price of the article, that is, 49.59 is inputted.

Next, as is shown in (b) of FIG. 6, if the yen key 9b is pressed (operated), the conversion processing is activated, that is, 49.95×160=7992 is calculated, and the result of the multiplication '7992' is displayed.

Figure 7:
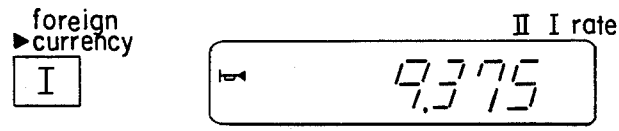

On the contrary, when yen is converted into dollars, operation is made as is shown in FIG. 7.

Consequently, the conversion processing, that is, the division of 1500÷160=9.375 is made and the result of the calculation, that is, '9.375' is displayed.

As is described above, the electronic apparatus with currency conversion function of this invention can automatically calculate the exchange rate by pressing two conversion keys, that is, one of the pair of the foreign currency key 9a and the yen key 9b, or, one of the pair of the foreign currency key 9A and the yen key 9B, inputting two numerals, that is, the amount of foreign money after conversion and the amount of yen before conversion. Of course, the conversion is not limited to conversion between yen and dollars. This invention can also be applied to various kinds of conversions, for example, conversion between dollars and marks, or between marks and francs.

This invention can be embodied, when desired, in various kinds of electronic apparatus, for example, an electronic calculator or a timepiece.

It is an advantage of the present invention that even though the currency conversion constant is unknown to the operator, the currency conversion constant is automatically set according to the amounts of the money before and after conversion, it is not necessary to input a currency conversion constant every time a conversion is made.

It is another advantage of the present invention that the converted amount is more accurate, since the decimals of a currency conversion constant set according to the invention are also significant figures.

While only certain embodiments of the present invention have been described, it will be apparent to those skilled in the art that various changes and modifications may be made thereof without departing from the spirit and scope of the present invention as hereinafter claimed.

What is claimed is:

1. Electronic apparatus having a currency conversion function, comprising:
   input means for inputting amounts of money in each of two different currencies;
   calculating means coupled to said input means for calculating a currency conversion exchange rate according to the amounts of money inputted at said input means;
   means included in said calculating means for subsequently calculating a currency conversion for a predetermined amount of money inputted at said input means based on said calculated conversion rate;
   mode selection means coupled to said calculating means and being manually operated by a user for selecting an exchange rate calculating mode and a currency conversion mode; and
   a visual display including exchange rate symbol means coupled to said calculating means, said exchange rate symbol means being activated in said exchange rate calculating mode upon the input of a money amount at said input means.

2. The electronic apparatus of claim 1 wherein said symbol means is activated in a first type operating state during said exchange rate calculating mode and in a second type operating state during said currency conversion calculating mode.

3. The electronic apparatus of claim 2 wherein said first type operating state comprises an intermittent state and said second operating state comprises a steady state.

4. The electronic apparatus of claim 3 wherein said intermittent state comprises a flashing display of said exchange rate symbol means and wherein said steady state comprises a continuous display of said exchange rate symbol means.

5. The electronic apparatus of claim 1 and further comprising means coupled to said calculating means for storing said calculated currency exchange rate.

6. The apparatus of claim 5 and further comprising means coupled to said means for storing for determining whether or not said conversion rate is calculated and stored in said means for storing said conversion rate.

7. The electronic apparatus of claim 5 and further comprising a random access memory coupled to said calculating means and including a plurality of shift registers and wherein said means for storing said exchange rate comprises one of said registers in said random access memory.

8. The electronic apparatus of claim 7 wherein said input means includes a manually operated set of input keys and one of said registers in said random access memory coupled to said input keys.

9. The electronic apparatus of claim 7 wherein said means for calculating said exchange rate comprises one of said registers in said random access memory.

* * * * *